(12) United States Patent
Sidorenko et al.

(10) Patent No.: US 9,478,994 B2
(45) Date of Patent: Oct. 25, 2016

(54) HIERARCHICAL SYSTEM FOR CONTROLLING A BATTERY OF ELECTRICAL ENERGY STORAGE DEVICES

(71) Applicants: Oleg Ivanovich Sidorenko, Saratov (RU); Vladimir Aleksandrovich Podlipalin, Saratov (RU); Aleksei Aleksandrovich Evseikin, Saratov (RU); Svetlana Vladimirovna Buzadzhi, Engels (RU); Natalia Andreevna Polulyakh, Engels (RU); Konstantin Sergeevich Distranov, Saratov (RU); Eduard Evgenevich Danilov, Engels (RU)

(72) Inventors: Oleg Ivanovich Sidorenko, Saratov (RU); Vladimir Aleksandrovich Podlipalin, Saratov (RU); Aleksei Aleksandrovich Evseikin, Saratov (RU); Svetlana Vladimirovna Buzadzhi, Engels (RU); Natalia Andreevna Polulyakh, Engels (RU); Konstantin Sergeevich Distranov, Saratov (RU); Eduard Evgenevich Danilov, Engels (RU)

(73) Assignee: Obshchestvo S Ogranichennoy Otvetstvennostyu "Sistemy Upravlenia Khraneniem Energii", Saratov (RU)

( * ) Notice: Subject to any disclaimer, the term of this patent is extended or adjusted under 35 U.S.C. 154(b) by 99 days.

(21) Appl. No.: 14/362,854

(22) PCT Filed: Jun. 24, 2013

(86) PCT No.: PCT/RU2013/000530
§ 371 (c)(1),
(2) Date: Jun. 4, 2014

(87) PCT Pub. No.: WO2014/021735
PCT Pub. Date: Feb. 6, 2014

(65) Prior Publication Data
US 2015/0008874 A1 Jan. 8, 2015

(30) Foreign Application Priority Data
Jul. 30, 2012 (RU) .................... 2012132679

(51) Int. Cl.
*H02J 7/00* (2006.01)
*H01M 10/42* (2006.01)

(52) U.S. Cl.
CPC ........ *H02J 7/0016* (2013.01); *H01M 10/4207* (2013.01); *H02J 7/007* (2013.01); *H02J 7/0018* (2013.01); *H02J 7/0021* (2013.01); *H02J 7/0022* (2013.01); *H02J 7/0026* (2013.01); *H01M 2010/4271* (2013.01)

(58) Field of Classification Search
CPC ... B60L 11/1811; B60L 11/1866; H02J 3/32; H02J 5/005; H02J 7/04; H02J 7/0008; H02J 7/0065
USPC ................. 320/107–108, 112, 116, 140, 166
See application file for complete search history.

(56) References Cited

U.S. PATENT DOCUMENTS

| 5,956,241 A | 9/1999 | LoCascio |
| 2013/0057200 A1* | 3/2013 | Potts ................. H02M 3/33584 320/107 |

FOREIGN PATENT DOCUMENTS

| RU | 37884 | 5/2004 |
| RU | 2230418 | 6/2004 |
| RU | 2324263 | 5/2010 |

*Primary Examiner* — Paul Dinh
(74) *Attorney, Agent, or Firm* — Preston Smirman; Smirman IP Law, PLLC

(57) ABSTRACT

The solution relates to the field of electrical engineering and can be used for producing high-voltage batteries of electrical energy storage devices for transport and power engineering requirements. What is proposed is: a hierarchial three-level system for controlling a battery of electrical energy storage devices, in which a lower control level is completely integrated with each storage device and comprises a transformer balancing circuit which makes it possible in a controlled manner to transmit energy from any storage device and back again into a DC main storage circuit which is open for the battery and thereby to selectively redistribute the energy between the storage devices independently of the location of said storage devices under the control of control units for all three levels, wherein a control unit for controlling a module of storage devices in the medium control level additionally solves the problem of thermal regulation of the battery, and a unit for controlling the battery in the upper control level solves the problems of the storage of statistical data and performing the functions of an electronic archive of events, expert analysis for diagnostics of battery cells, evaluation of residual service life and optimization of the charge from an on-board charger depending on the status of the storage devices and external conditions, as well as ensuring tolerance to the type of electrical energy storage devices.

1 Claim, 1 Drawing Sheet

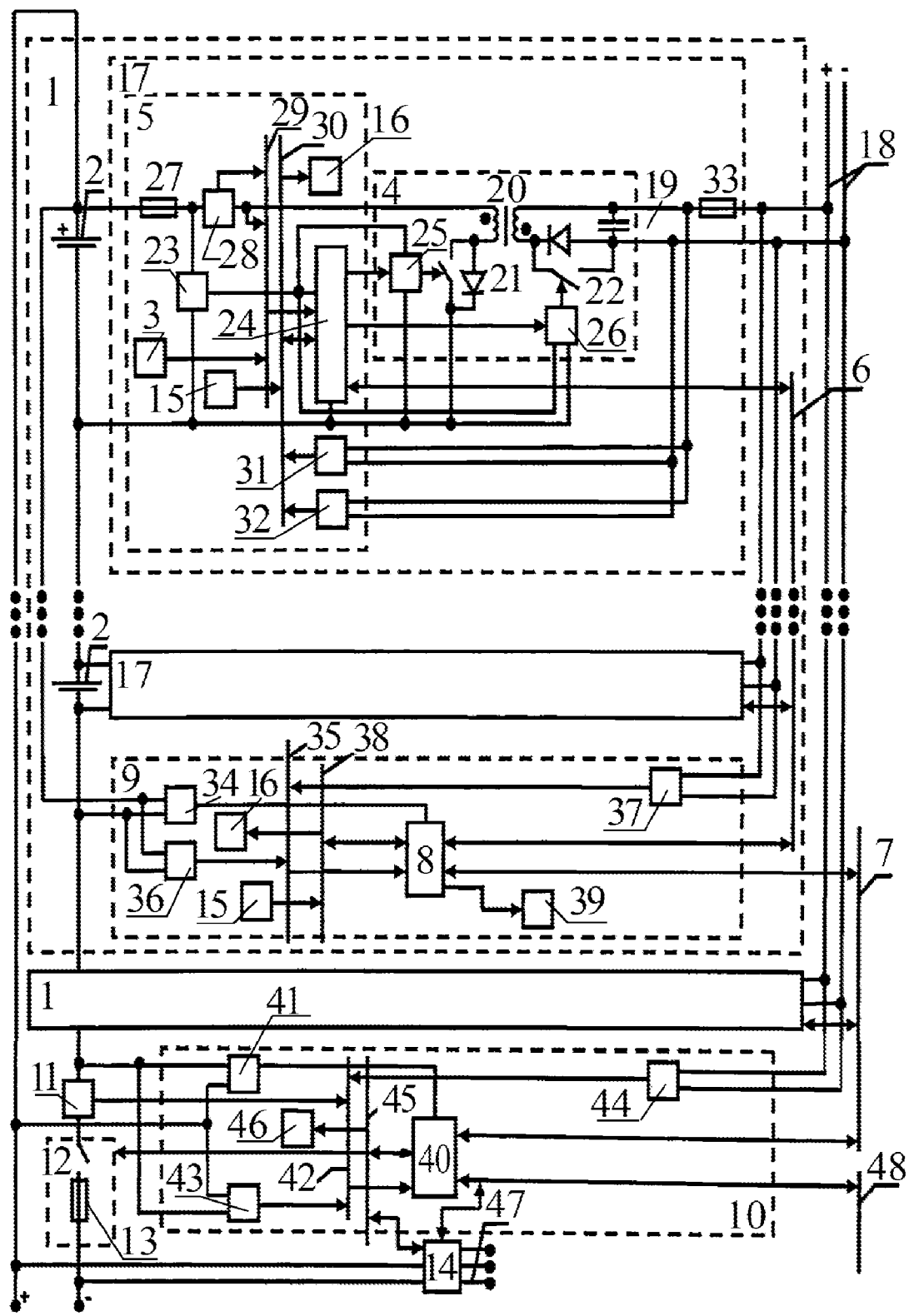

HIERARCHICAL SYSTEM FOR CONTROLLING A BATTERY OF ELECTRICAL ENERGY STORAGE DEVICES

CROSS-REFERENCE TO RELATED APPLICATION

The instant application is a national phase of PCT International Application No. PCT/RU2013/000530, filed on Jun. 24, 2013, and claims priority to Russian Patent Application Serial No. 2012132679, filed Jul. 30, 2012, the entire specifications of both of which are expressly incorporated herein by reference.

FIELD OF TECHNOLOGY

The invention relates to the field of electrical engineering and can be used to create electrical energy storage batteries of different nature from the lithium-ion batteries to supercapacitors and chemical power sources as part of autonomous power supply systems (also in transport), uninterruptible power systems, systems of operational DC and network drives.

BACKGROUND

The problem of long life of high-voltage and high-energy consumption batteries, consisting of a large number of series-connected batteries, is relevant since even small differences in the characteristics of the individual batteries taking place at acquisition of batteries during operation leads to a significant imbalance in the state of charge of the individual batteries. This results in a reduction of given battery capacity to the load, overcharge and overdischarge of individual elements with the possibility of polarity reversal, depressurization and other irreversible and adverse events that ultimately lead to a reduction in battery life. One of the solutions to this problem is to equalize voltage imbalance between the individual elements of the battery (electrical energy storage) by selective overvoltage shunting of individual elements using resistors in the battery control system with passive balancing [the RF patent number 2324263, IPC H01M10/48, H02J7/02].

However, this solution is not energy efficient as it leads to unnecessary loss of energy and also causes undesirable overheating of the entire battery as equalizing electrical circuit is usually localized in the battery case.

Known electrical energy storage battery comprising a number of individual cells or modules connected in a series circuit, battery control system as well as electronic units ensuring equalization of voltage on individual storage elements whose power is provided by an additional source of power [the RF patent number 2230418, IPC H02J7/00, H01M10/44].

The disadvantage of the battery is the complexity of its operation due to an external source of energy that requires additional maintenance, and in the case of a stationary source of energy-loss of autonomy (mobility) of the battery.

On set of similar essential features closest to the claimed system is a hierarchical control system of electrical energy storage battery powered from the battery itself [Article "Special features of the monitoring and protective equipment of high-voltage lithium-ion batteries for power supply systems of spacecraft"/Proceedings of NPP VNIIEM, 2011, Vol. 123, No. 4, p. 29-34 by Ganzburg M. F., Gruzdev A. I., Trofimenko V. I. (AVEKS OJSC)].

On the lower control level the system contains modules of the electrical energy storage with temperature sensors, units of identification numbers of storages and modules and their status indicators and also equalizing, switching and control devices connected via serial communication link with a current measuring module and serial line controller on middle control level, connected via serial communication link with the battery control unit of top-level control, connected to the onboard charger. Active equalizing device on the lower control level is made using transformer circuit to redistribute energy in the battery between module storages [the RF patent No. 37884, IPC H02J7/00].

Compared with passive overcharge shunting of most charged storages, the active system chosen as a prototype for the claimed technical solution can compensate not only the difference in the self-discharge of storages but also partly the loss of their capacity, and balance the battery not only when charged, but also in other modes of operation, including the discharge.

However, the known hierarchical control system of electrical energy storage battery has the following disadvantages: 1) the complexity of implementing the active equalization method using the proposed transformer circuit applied to the high-voltage battery with a large number of series-connected storages (up to 160 pcs.) to use in transport, since the transformer prototype should have a working winding number of storages on the same core. Actually it is possible for the transformer to only reach no more than 8-10 module storages (8 pieces in the prototype) and that is why the problem of intermodule equalization remains unsolved; 2) poor integration of the control system with the battery itself, which does not allow to implement at the level of individual energy storages not only equalizing device that is installed directly on terminals of each storage, but the control device for each storage installed in the prototype on the side of the modules; 3) the only problem solved in the prototype at the middle control level is the problem of data exchange between units of the lower level and the battery control unit of top-level (gateway task processing and data relay) and in terms of control problems the hierarchical system in the prototype is more two-level rather than three-level, while the problem of providing thermoregulation in the battery is not covered.

Revealing Technical Solutions

The claimed technical solution has been challenged to create a hierarchical three-level control system of electrical energy storage battery, free from the listed disadvantages, i.e. creation of a hierarchical control system with active equalization transformer circuit, covering any number of storages, allowing to transfer energy between them regardless of their location and integrated together with the control device of each battery storage, also providing thermoregulation of the battery at the module level of electrical energy storage.

The problem is solved by proposing hierarchical control system of electrical energy storage battery that is powered from the battery and contains modules of series-connected electrical energy storages with temperature sensors, units of identification numbers of storages and modules, their status indicators and active equalization devices based on transformer circuit which is associated with the appropriate control devices connected via intramodular serial communication link through the channel controller to the battery control unit connected to the current sensor, switch fuse and on-board charger, which are series-connected with storage modules.

The new in the system is that the equalization device and the control device performed for each battery storage as a single constructive lower level control circuit i.e. the storage control unit, wherein the equalization device configured as bidirectional transfer of energy from a single storage to a through storage mainline of DC battery and back which have parallel-connected capacitors of storage control units, connected in parallel to secondary windings of the storage transformer that is executed by the type of back-way power converter, increasing to the storage mainline of battery with the electronic keys shunted by diodes in the primary and secondary windings of the transformer. Control device of the storage control unit is made on the basis of the storage powered from voltage converter of the microcontroller connected to the electronic keys in the primary and secondary windings of the transformer of the equalization device through the driver and the galvanically separated driver respectively powered from a voltage converter. The primary winding of the storage transformer of the storage control unit is connected to the output "+" of the respective storage via a fuse and a current sensor, and via the electronic key to the storage output "−" and the common wire of the voltage converter, microcontroller and control drivers of keys of storage control unit. Outputs of the current sensor, temperature sensor and storage output "+" are connected to the bus of measurement signals of the microcontroller of storage control unit, to the bus of single commands of which are connected: unit of storage identification number, the storage status indicator and comparators of upper and lower levels connected to the storage mainline of battery through the self-recovering fuse. Outputs of serial interface of microcontroller storage control units are connected via galvanic separation unit to intramodular serial communication link connected to the middle-level module control unit of battery control containing a microcontroller which is powered from the module through a voltage downconverter. The bus of measurement signals of the microcontroller module control unit has the connected outputs "+" and "−" of storage module via the measurement circuit, and has connected outputs "+" and "−" of storage mainline of battery via a the galvanically separated measurement circuit. The bus of single commands of the microcontroller module control unit has the connected module status indicator and unit of module identification number, and the thermoregulation unit with executive devices in the form of fans, electric heaters and dampers is connected to the outputs of microcontroller unit.

Outputs of serial interface of microcontroller module control unit connected via galvanic separation unit to intermodule serial communication link which is connected the battery control unit of top-level control that contains the microcontroller with high performance and memory capacity powered via battery through voltage downconverter, to the bus of measurement signals of which the battery current sensor is connected, to the measurement circuit of which the battery outputs "+" and "−" are connected, to the galvanically separated measurement circuit of which the buses "+" and "−" of storage mainline of battery are connected; to the bus of single commands of which the battery status indicator, switch control input and on-board charger are connected, and the outputs of the serial interface are connected via the galvanic separate unit to the serial communication link with external systems and to the on-board charger.

The technical result of the claimed system is that the offered three-level hierarchical control system of electrical energy storage battery, in which the lower level of control is fully integrated with each storage and contains the transformer circuit equalization that allows controlled transfer of energy from any available storage and back the storage DC mainline, through the battery, and thereby selectively transfer energy between the storages regardless of their location under the control of the control units of all three layers, wherein the module control unit of the storages of the middle-level control further solves the problem of the battery thermoregulation and the battery control unit of top-level control solves the problems of statistical data storage and perform functions of an electronic archive of events, expert analysis for the diagnosis of the battery cells, residual life assessment and optimization of charge via on-board charger depending on the status of storages and external environment as well as providing tolerance to the type of electrical energy storage.

The FIGURE shows a functional block diagram of the proposed solution, where 1—electrical energy storage module; 2—electrical energy storage; 3—temperature sensor; 4—charge equalization device; 5—control device; 6, 7, 48—serial communication link 8, 24, 40—microcontroller; 9—module control unit; 10—battery control unit; 11, 28—current sensor, 12—switch; 13—safety fuse; 14—on-board charger, 15—units of identification numbers; 16, 46—status indicator, 17—storage control unit; 18—DC storage mainline; 19—capacitor, 20—storage transformer, 21—diode; 22—electronic key; 23—voltage converter; 25—driver; 26—galvanically separated driver, 27—fuse; 29, 35, 42—bus of measurement signals; 30, 38, 45—bus of single commands; 31—top-level comparator; 32—low-level comparator; 33—self-recovering fuse; 34, 41—voltage downconverter; 36, 43—measuring circuit; 37, 44—galvanically-separated measuring circuit; 39—thermoregulation unit with executive devices; 47—outputs for connection of external three-phase AC.

The claimed system contains modules 1 of series-connected electrical energy storages 2 with temperature sensors 3 and charge equalization devices based on transformer circuit 4 which redistributes energy between the storages 1 of the module 1 associated with the appropriate control device 5 connected via galvanically-separated intramodular serial communication link 6 (not shown) and galvanically-separated inter-module serial communication link 7 (not shown) via the channel controller integrated in the microcontroller 8 of the module 1 control unit 9 to the battery control unit 10 connected to the current sensor 11 which is series-connected with the storage 2 modules, to the switcher 12 with a safety fuse 13 and to the on-board charger 14. Electrical energy storage modules 1 contain units 15 of identification numbers of modules and installed storages and contain module 1 status indicators 16 of the battery 2 storages. The equalization device 4 and the control device 5 performed for each battery storage 2 as a single constructive lower level control circuit i.e. the storage control unit 17, wherein the equalization device 4 configured as bidirectional transfer of energy from a single storage 2 to a through storage mainline 18 of DC battery and back which have parallel-connected capacitors 19 of storage 2 control units 17, connected in parallel to secondary windings of the storage transformer 20 that is executed by the type of back-way power converter, increasing to the storage mainline 18 of battery with the electronic keys 22 shunted by diodes 21 in the primary and secondary windings of the transformer 20. Control device 5 of the storage 2 control unit 17 is made on the basis of the storage 2 powered from voltage converter 23 of the microcontroller 24 connected to the electronic keys 22 in the primary and secondary windings of the transformer 20 of the equalization device 4 through the driver 25 and the galvanically separated driver 26 respectively powered from a voltage converter 23. The primary winding of the storage transformer 20 of the storage 2 control unit 17 is connected to the output "+" of the respective storage 2 via a fuse 27 and a current sensor 28, and via the electronic key 22 to the storage 2 output "−" and the common wire of the voltage converter 23, microcontroller 24 and drivers 25, 26 of keys 22 control. Outputs of the current sensor 28, temperature sensor 3 and storage 2 output "+" are connected to the bus 29 of measurement signals of the microcontroller 24 of storage 2 control unit 17, to the bus 30 of single commands of which are connected: unit 15 of storage 2 identification number, the storage 2 status indicator 16 and comparators of upper 31 and lower 32 levels connected to the storage mainline 18 of battery through the self-recovering fuse 33. Outputs of serial interface of microcontroller 24 storage control units 17 are connected via galvanic separation units (not shown) to intramodular serial communication link 6 connected to the middle-level module 1 control unit 9 of battery control containing a microcontroller 8 which is powered from the module 1 through a voltage downconverter 24 from series-connected storages 2. The bus of measurement signals 35 of the microcontroller 8 module control unit 9 has the connected outputs "+" and "−" of storage module 1 via the measurement circuit 36, and has connected outputs "+" and "−" of storage mainline 18 of battery via a the galvanically separated measurement circuit 37. The bus of single commands 38 of the microcontroller 8 has the status indicator 16 of storage 2 module 1 and unit of module 1 identification number 15, and the thermoregulation unit 39 with executive devices in the form of fans, electric heaters and dampers (not shown) is connected to the outputs of microcontroller 8 unit. Outputs of serial interface of microcontroller 8 module 1 control unit 9 of storages 2 connected via galvanic separation unit (not shown) to intermodule serial communication link 7 which is connected the battery control unit 10 of top-level control that contains the microcontroller 40 with high performance and memory capacity powered via battery through voltage downconverter 41. The bus of measurement signals of the microcontroller 40 battery control unit 10 has the connected battery current sensor 11, outputs "+" and "−" of battery are connected via the measurement circuit 43, and outputs "+" and "−" of storage DC mainline 18 connected via the galvanically separated measurement circuit 44, and the bus of single commands 45 of the microcontroller 40 has the connected battery status indicator 46, switch 12 control input and on-board charger 14 connected to the external three-phase AC via outputs 47. Outputs of serial interface of microcontroller 40 battery control unit connected via galvanic separation unit (not shown) to intermodule serial communication link 48 with external systems and to on-board charger 14.

The claimed hierarchical control system of electrical energy storage battery works as follows.

In the battery charging from an external high-voltage DC power supply, connected to external battery terminals "+" and "−" or charged via on-board charger 14 that is connected to an external AC power supply through outputs 47, the charging current of up to several hundred amperes passes through all series-connected storages 2 structurally combined in modules 1 from terminal "+" to terminal "−" of modules and the entire battery that is recognized by the microcontroller 40 of the battery control unit 10 powered from the battery through the voltage downconverter 41 by the current sensor 11.

The microcontroller 40 measures the current in the battery via the bus of the measurement signals 42 and the in-built ADC in magnitude and direction, while the microcontrollers 24 of the storage control units 17, powered from the voltage converters 23, simultaneously measure and continuously monitor the voltage on each module 1 storage 2 via the bus of the measurement signals 29, with the control devices 5 of storage control units 17 built in the ADC microcontroller, and transfer the information and an identification number given by the unit 15 via the bus of single commands 30 through serial communication links 6 and 7 via the module microcontroller 8 to the microcontroller 40 of the battery control unit 10.

When the voltage of any single storage 2 is out of acceptable values stored as settings in the memory of the microcontroller 40 of the battery control unit 10, the latter breaks the battery charging circuit through the switch 12 via the bus of single commands 45. In this regard the equalization device 4 controlled by the microcontrollers 24, 8 and 40 can carry out intramodular selective voltage equalization, redistributing power between the module 1 storages 2 by current measurements done by the microcontroller 24 plus collected in the microcontroller 40 statistics. In detail the equalization device 4 operates as follows. In case of excess voltage on any storage 2 relative to the average value calculated in the microcontroller 40 of the battery control unit 10 according to the data received from the storage control units 17 of the lower level control, the microcontroller 40 commands via the serial communication link 7 to the respective module control unit 9 which is recompiled by the microcontroller 8 of this unit via the serial communication link 6 to the respective 6 storage control unit 17 to the microcontroller 24 of the unit. The microcontroller 24 through the driver 25 closes the key 22 by PWM signal for a time respective to the value of imbalance, while controlling the current in the primary winding of the transformer 20 via the bus of measurement signals 29 using the current sensor 28. When the key 22 circuit to the primary winding of the storage transformer 20 the storage 2 voltage is applied, and the magnetic current starts to increase and hence accumulate energy in the transformer 20.

When locking the electronic key 22 and switching off the primary winding of the transformer 20 from the respective storage 2, current flowing through the primary winding of the transformer 20 is sharply reduced, putting in its secondary winding the EMF unlocking the diode 21. In the secondary winding of the transformer 20 current begins to flow, which charges the capacitors 19 of the battery storage mainline 18. By changing the timing parameters of the PWM signal in the primary circuit of the transformer 20 the voltage in the storage mainline 18 can be controlled. Thus, there is an energy transfer from the selected battery storage 2 to the storage mainline 18. In case of a voltage drop on any storage 2 relative to the average value, the mechanism of the selective energy transmission runs in the opposite direction to recharge currents in the selected storage of up to several tens of amperes. The microcontroller 24 closes the key 22 through the driver 22 in the secondary circuit of the transformer 20, after the opening of which in the primary winding of the transformer 20 the EMF is induced, the diode 21 is opened, and the energy stored in the storage transformer 20 is transferred to the selected storage 2 increasing the voltage across it. If it turns out that the storage mainline 18 is low, it is detected by the microcontrollers 8 and 40 via the measuring circuits 37 and 44 and the measurement buses 35 and 42 respectively, and by the microcontrollers 24 of the storage control units 17 using the lower level comparator 32. The equalization circuits 4 of the storage 2 control units 17 will transfer energy from the most charged storages 2 to the storage mainline 18 to establish the voltage within an allowable range, the values of which are stored as a setting in non-volatile memory of the microcontroller 40 of the battery control unit 10. If in the process of balancing the voltage in the storage mainline 18 exceeds the upper threshold, the comparators 31 will activate in the storage control units and the microcontrollers 24 cease to perform the mode of energy transfer to the storage mainline 18, and after receiving the command from the microcontroller 40 may shift to energy transfer to the storages 2, thereby discharging the mainline 18 and reducing the voltage on it. In the mode of the battery discharge, current of up to several hundred amperes flows through the battery in the opposite direction from the charge, giving the load power to the battery. While the proposed mechanism of selective voltage equalization on selected storages continues to operate as measured at the lower control level and processing of this information at the top level. If there is any overdischarge of any storage 2, the microcontroller 40, that received this information from the microcontroller 24 of the lower control level, breaks the power load circuit with the help of the switch 12 via the bus of the single commands 45, and the respective equalization device 4 under control of the microcontroller 24 will lead controlled energy transfer to this storage from the general storage mainline 18. In the mode of energy storage, current in the power circuit of the battery is missing. In this case the intramodular and intermodular voltage equalization on the battery storages can be done using the described mechanism of selective active and bi-directional transmission of energy including, while operating the battery, the stored statistics about the quality of its individual storages. In either mode of operation, the storage control units 17 measure the temperature of the respective storages 2 at one of its terminals using temperature sensors 3 via the bus of measurement signals 29, and transmit the measured values over the serial communication link 6 to the microcontroller 8 of the module control unit 9 which maintains the temperature of the module 1 storages 2 within specified limits by enabling or disabling using thermoregulation unit 39 the executive devices (dampers, electric heaters and fans). In case of overheating or overcooling the storages 2, the microcontrollers 24, 8 and 40 of the control units 17, 10 and 9 respectively, transmit information to external systems via the serial communication links 6, 7 and 48. This information also includes data on the number of storages in the modules and the number of modules in the battery, data on state of the storages (state of charge), the voltage across the battery and the modules, emergency situations in the battery (overheating, overcharge, overdischarge, microcontroller control system failures). Voltage on the modules 1 is measured by the microcontroller 8 with in-built ADC and the measuring circuit 36 via the bus of measurement signals 35, and the battery voltage is measured by the microcontroller 40 of the battery control unit 10 with in-built ADC and the measuring circuit 43 via the bus of measurement signals 42. The fuses 27 in the storage control units 17 are installed in case of external short circuits of the storages 2, the resettable fuses 33—in case of overcurrent of the storage mainline 18, the fuse 13 provides overcurrent protection of the entire battery. The battery control unit 10 when charging from the on-board charger 14 generates a command to turn it on, for example, as the closure of "dry" contacts. Current sensors 11, 28 may be formed on the basis of the Hall effect. The information from the current sensor 11 may be used by the microcontroller 40 for correcting the measured voltage values of the storages on the lower level to calculate the charging and discharge capacity of the storages, the modules and the battery as well as to protect the battery from overcurrent. Thermoregulation unit 39 is a set of matching power amplifiers for the number and type of executive devices. Status indicators 16 of the storages, the modules 16 and the battery 46 in the simplest case can be implemented by means of LEDs using an intuitive "traffic light" color symbols to indicate the state of the parameter (e.g. storage voltage) in three gradations: "normal", "warning" and "failure". Units of storage identification numbers 15 may be implemented in the form of microswitches or electric jumpers on the respective printed circuit boards. Measuring circuits 36, 43 are just common circuits on operational amplifiers and the galvanically-separated measuring circuits 37, 44—circuits using sigma-delta modulation. Application of microcontrollers on each storage as opposed to using ASICs, allows to quickly change not only the settings, but also the algorithms of the system, use complex algorithms to predict the status of the battery cells and minimize the number of uncontrolled battery storages in case of failure of the control microcontrollers of lower control level. Increased performance and memory of the microcontroller 40 of top-level control are necessary to ensure the implementation of the program features of the electronic archive of events, and accumulation of statistics, expert analysis for the diagnosis of the battery cells, residual life assessment and optimization of charge from the on-board charger 14 depending on the condition of the storages 12 and external conditions as well as providing tolerance to the type of electrical energy storages. The links with RS 485 and CAN interfaces can be used as the serial communication links 6, 7, 48.

The invention claimed is:

1. A hierarchical control system of an electrical energy storage battery, comprising:

modules of series-connected electrical energy storage with temperature sensors;

units of identification numbers of the storage modules and status indicators thereof; and units of active charge equalization according to a transformer circuit connected with a corresponding control device that is connected via an intramodular serial communication link through a channel controller to a battery control unit connected to a current sensor which is series-connected with the storage modules, to a switcher with a safety fuse and to an on-board charger;

wherein a charge equalization device and the control device are performed for each battery storage module as single constructive lower level control circuits including a storage control unit;

wherein the equalization device is configured as a bidirectional transfer of energy back and forth from a single storage to a through storage mainline of a DC battery which have parallel-connected capacitors of storage control units, connected in parallel to secondary windings of a storage transformer that is executed by way of a power converter, increasing to the storage mainline of the battery with electronic keys shunted by diodes in primary and secondary windings of the transformer;

wherein the control device of the storage control unit is made according to the storage powered from a voltage converter of a microcontroller connected to the electronic key in the primary and secondary windings of the transformer of the equalization device through a driver and a galvanically separated driver respectively powered from a voltage converter;

wherein the primary winding of the storage transformer of the storage control unit is connected to an output "+" of the respective storage via a fuse and a current sensor, and via the electronic key to a storage output "−" and a common wire of the voltage converter, microcontroller and control drivers of keys of storage control unit;

wherein outputs of the current sensor, temperature sensor and storage output "+" are connected to a bus of measurement signals of the microcontroller of the storage control unit, to a bus of single commands of which they are connected;

wherein the units of storage identification number, the storage status indicators and comparators of upper and lower levels are connected to the storage mainline of the battery through a self-recovering fuse;

wherein outputs of a serial interface of the microcontroller storage control units are connected via a galvanic separation unit to an intramodular serial communication link connected to a middle-level module control unit of the battery control containing a microcontroller which is powered from the module through a voltage downconverter;

wherein the bus of measurement signals of the microcontroller module control unit has the connected outputs "+" and "−" of the storage module via a measurement circuit, and has connected outputs "+" and "−" of the storage mainline of the battery via a galvanically separated measurement circuit;

wherein the bus of single commands of the microcontroller module control unit has the connected module status indicator and unit of module identification number, and a thermoregulation unit with executive devices in the form of fans, electric heaters and dampers is connected to the outputs of microcontroller unit;

wherein outputs of the serial interface of microcontroller module control unit is connected via the galvanic separation unit to an intermodule serial communication link which is connected the battery control unit of a top-level control that contains the microcontroller with high performance and memory capacity powered via the battery through the voltage downconverter, to the bus of measurement signals of which the battery current sensor is connected, to the measurement circuit of which the battery outputs "+" and "−" are connected, to the galvanically separated measurement circuit of which the buses "+" and "−" of the storage mainline of the battery are connected, to the bus of single commands of which the battery status indicator, switch control input and on-board charger are connected, and the outputs of the serial interface are connected via the galvanic separation unit to the serial communication link with external systems and to the on-board charger.

* * * * *